US012631364B2

(12) United States Patent
Gangitano et al.

(10) Patent No.: US 12,631,364 B2
(45) Date of Patent: May 19, 2026

(54) UNIVERSAL AIR INTERFACE

(71) Applicant: Zeppelin, LLC, San Jose, CA (US)

(72) Inventors: Keith Gangitano, San Jose, CA (US);
Anthony Joseph Gangitano, San Jose,
CA (US); Cole James Maston,
Sunnyvale, CA (US)

(73) Assignee: Zeppelin LLC, San Jose, CA (US)

( * ) Notice: Subject to any disclaimer, the term of this
patent is extended or adjusted under 35
U.S.C. 154(b) by 0 days.

(21) Appl. No.: 18/608,883

(22) Filed: Mar. 18, 2024

(65) Prior Publication Data

US 2024/0328660 A1 Oct. 3, 2024

Related U.S. Application Data

(60) Provisional application No. 63/455,292, filed on Mar.
29, 2023.

(51) Int. Cl.
*F24F 13/02* (2006.01)
*F16L 11/12* (2006.01)
*F24F 13/10* (2006.01)
*E04B 1/70* (2006.01)

(52) U.S. Cl.
CPC ........... *F24F 13/0209* (2013.01); *F16L 11/12*
(2013.01); *F24F 13/0218* (2013.01); *F24F*
*13/10* (2013.01); *E04B 1/7092* (2013.01)

(58) Field of Classification Search
CPC .... F24F 13/0218; F24F 13/0209; F24F 13/02;
F16L 11/12

USPC ........................................................ 285/260
See application file for complete search history.

(56) References Cited

U.S. PATENT DOCUMENTS

| | | | | |
|---|---|---|---|---|
| 3,705,736 A | * | 12/1972 | Dawson | F16L 21/002 |
| | | | | 285/260 |
| 8,637,768 B2 | * | 1/2014 | Sawyer | F24F 13/0218 |
| | | | | 138/155 |
| 8,925,973 B2 | * | 1/2015 | Untch | F16L 31/00 |
| | | | | 285/260 |
| 2019/0285309 A1 | * | 9/2019 | Raeburn | F24F 13/0209 |

FOREIGN PATENT DOCUMENTS

| | | | | | |
|---|---|---|---|---|---|
| GB | 2027148 A | * | 2/1980 | | F16L 21/08 |
| GB | 2061437 A | * | 5/1981 | | F16L 31/00 |

* cited by examiner

*Primary Examiner* — David Bochna
(74) *Attorney, Agent, or Firm* — André Grouwstra

(57) ABSTRACT

An air interface of a flexible and airtight material includes a
first ring and a second ring (both adjustable in size), a first
ring holder to removably hold the first ring, a second ring
holder to removably hold the second ring, a cord holder, and
a cord with a lock-and-release mechanism to adjust its
effective length. The first and second ring holder and the
cord holder create a saddle between the first ring and the
second ring, and an extension between the second ring and
the cord. The extension can be wrapped over the saddle and
back up to create a pocket. A flexible duct can be wrapped
around the second ring. The end of the flexible duct can be
thickened or tightened and inserted into the pocket. The
flexible duct is trapped in (or released from) the pocket by
adjusting the cord's effective length.

16 Claims, 5 Drawing Sheets

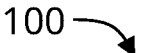
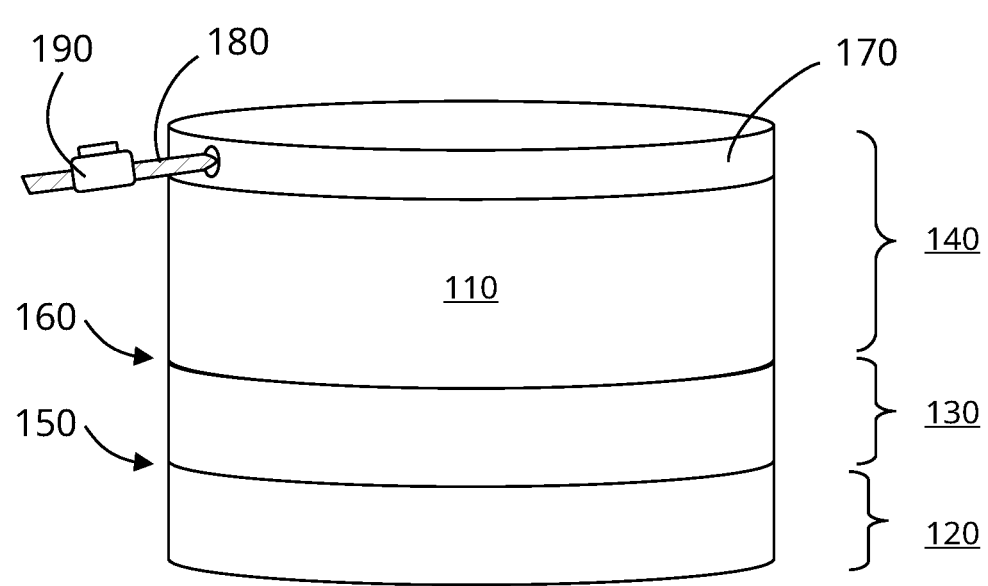
FIG. 1
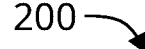
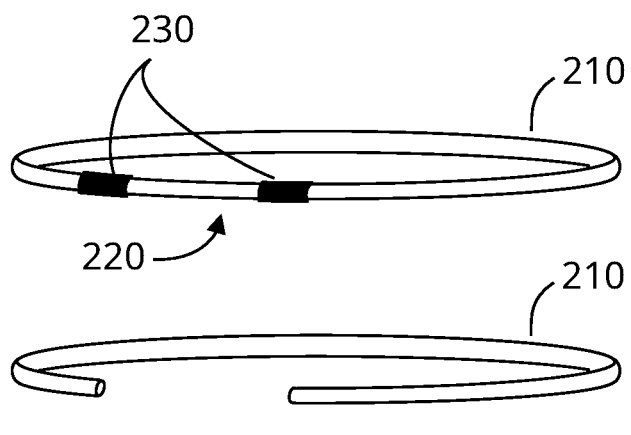
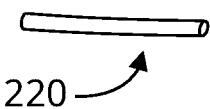
FIG. 2

300

400

700

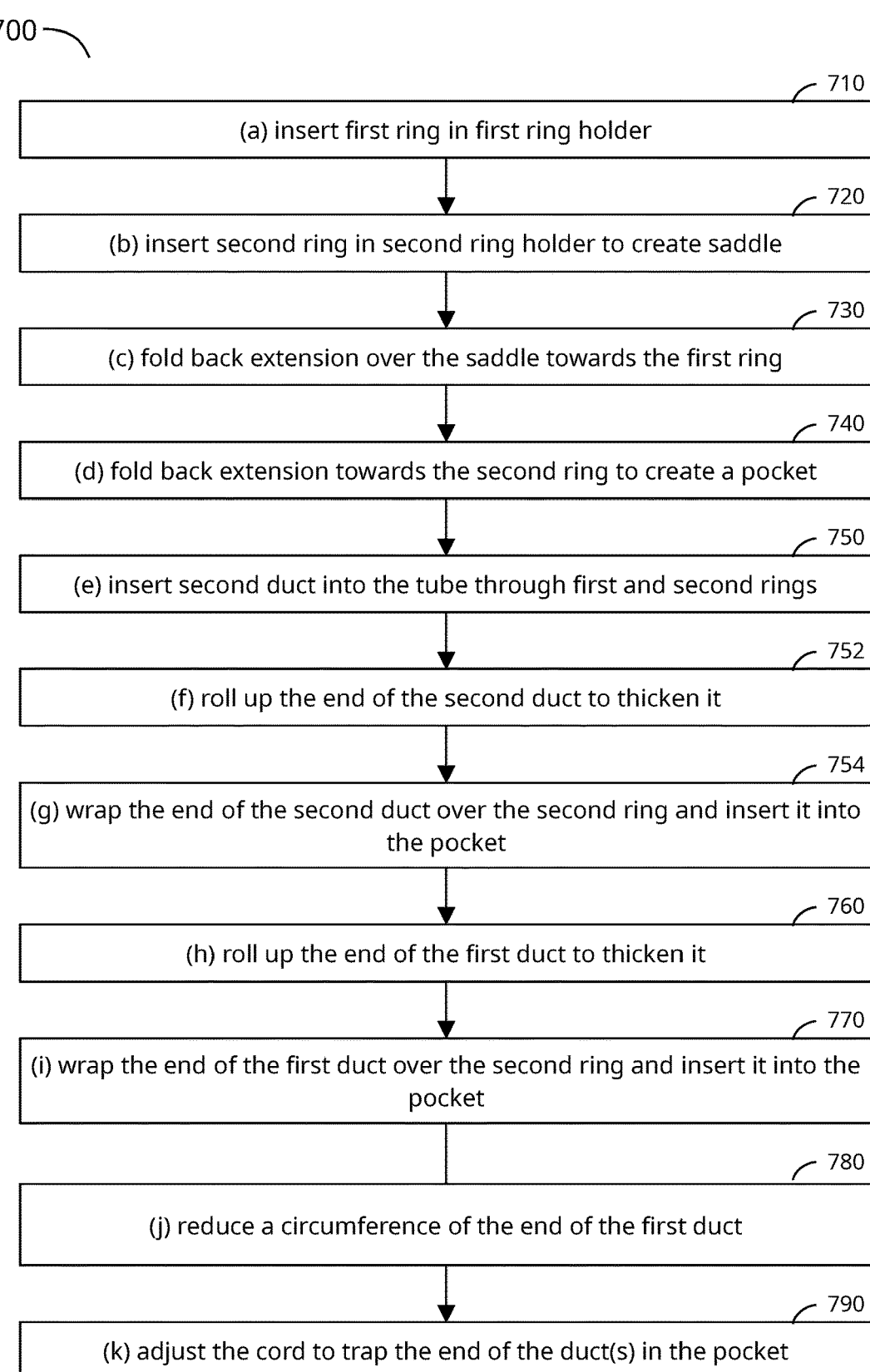

710
(a) insert first ring in first ring holder 720
(b) insert second ring in second ring holder to create saddle 730
(c) fold back extension over the saddle towards the first ring 740
(d) fold back extension towards the second ring to create a pocket 750
(e) insert second duct into the tube through first and second rings 752
(f) roll up the end of the second duct to thicken it 754
(g) wrap the end of the second duct over the second ring and insert it into the pocket 760
(h) roll up the end of the first duct to thicken it 770
(i) wrap the end of the first duct over the second ring and insert it into the pocket 780
(j) reduce a circumference of the end of the first duct 790
(k) adjust the cord to trap the end of the duct(s) in the pocket

Blow air into a first side of the first tube

820

Adjust the effective length of the cord in the cord holder at a second side of the first tube to limit the effective opening

UNIVERSAL AIR INTERFACE

REFERENCES

This application claims priority from U.S. provisional patent application Ser. No. 63/455,292, entitled "Universal Air Interface", filed on Mar. 29, 2023. The priority application is hereby incorporated by reference, as if it is set forth in full in this specification.

Each publication, patent, and/or patent application mentioned in this specification is herein incorporated by reference in its entirety to the same extent as if each individual publication and/or patent application was specifically and individually indicated to be incorporated by reference.

BACKGROUND

Technical Field

The disclosed implementations relate generally to tools and methods used in the water restoration and general construction industries, and in particular to those for controlling temperature, relative humidity, and air flow in an affected space, as well as controlling contamination and noise pollution of adjoining spaces. Implementations further relate to tools and methods used in the healthcare and personal care industries, in particular to those for keeping rooms hygienic and for controlling microbes and infective agents. Implementations also relate to mining, law enforcement, IT, science, heating, ventilation and air conditioning, and food industries.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Water leaks in buildings create damage and unhealthy conditions. Professionals in the water restoration industry mitigate these by drying out affected structures. In healthcare and personal care industries there is a need to contain infectious diseases, for example by creating safe spaces for workers, patients, and/or customers. Such a need may be temporary, creating a situation much like that in the restoration industry, even though there may be no need to remove moisture. Other industries also have a need to temporarily separate a part of a building from other parts and create a barrier against the spread of harmful conditions.

In some cases, a temporary containment of a contaminated or potentially hazardous space requires a (relatively) negative air pressures, and in some other cases containment (for example of a safe space) may require a positive air pressure, i.e., an air pressure that is higher than in adjacent unsafe spaces.

BRIEF DESCRIPTION OF THE DRAWINGS

The technology will be described with reference to the drawings, in which:

FIG. 1 illustrates an example air interface.

FIG. 2 illustrates an example of a ring used in an implementation.

FIG. 7 shows an example method of coupling one or two ducts to an air interface.

Figure 3:
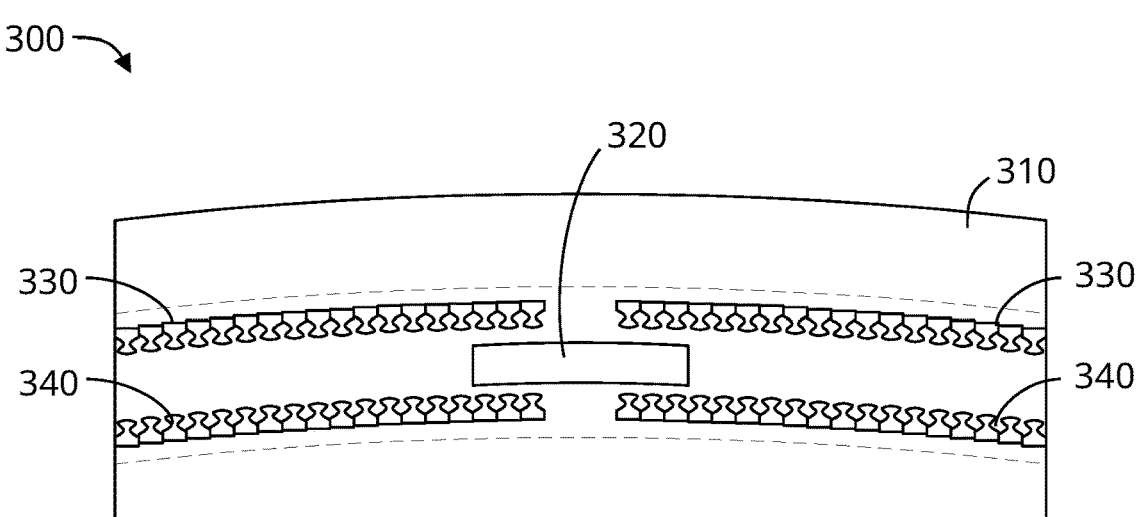
FIG. 3 illustrates an example ring holder.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the disclosed technology.

DETAILED DESCRIPTION

Water leaks in buildings create damage and unhealthy conditions. Professionals in the water restoration industry mitigate these by drying out affected structures. In healthcare and personal care industries there is a need to contain infectious diseases, for example by creating safe spaces for workers, patients, and/or customers. Such a need may be temporary, creating a situation much like that in the restoration industry, even though there may be no need to remove moisture. Other industries also have a need to temporarily separate a part of a building from other parts and create a barrier against the spread of harmful conditions.

In some cases, a temporary containment of a contaminated or potentially hazardous space requires a (relatively) negative air pressure, and in some other cases containment (for example of a safe space) may require a positive air pressure, i.e., an air pressure that is higher than in adjacent unsafe spaces.

One method of containment uses inflatable barriers to separate spaces. Barriers may be large, for example to create a temporary wall, or small, for example to fit in a window. Since inflatable barriers can be reusable, in some cases they may need to support a relatively small flow of air from one side of the barrier to the other side, and in some cases a relatively large flow. Thus, the size of ducts that may need to be coupled with the inflatable barrier can vary significantly, for example from a diameter of just six (6) inches to a diameter of twelve (12) inches or more.

This document introduces a universal air interface that can be used to couple ducts with air barriers, whether inflatable or not, or with other ducts, and methods to use the air interface. The novel air interface is reusable, compact, lightweight, machine-washable, and readily supports both rigid and flexible ducting of various diameters.

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms "comprising" and "consisting" have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term "coupled" is used in an operational sense and is not limited to a direct or an indirect coupling. "Coupled to" is generally used in the sense of directly coupled, whereas "coupled with" is generally used in the sense of directly or indirectly coupled. Coupling may be mechanical, chemical, galvanic (in this context meaning that a direct electrical connection exists), capacitive, inductive, electromagnetic, optical, or through any other process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The terms "substantially", "close", "approximately", "near", and "about" refer to being within minus or plus 10% of an indicated value, unless explicitly specified otherwise.
Implementations FIG. 1 illustrates an example air interface 100. Air interface 100 comprises a first tube 110 made of a flexible material, inside of which are a first ring holder (at location 150) and a second ring holder (at location 160). A first ring may removably be placed in the first ring holder, and a second ring may removably be placed in the second ring holder. The first ring holder and the second ring holder are each configured to hold at least a part of the first ring and second ring, respectively. The flexible material may include a fabric such as canvas, or a plastic, or any other flexible material that is relatively strong and airtight. A cord holder 170, for example a sleeve, is configured to hold a cord 180, whose effective length is adjustable using lock-and-release mechanism 190. The first ring, second ring, and cord holder 170 functionally partition first tube 110 in an optional first part 120 below the first ring, a saddle 130 between the first ring and the second ring, and an extension 140 between the second ring and cord holder 170. Some implementations do not have the optional first part 120. Although implementations of air interface 100 can have any size, in one example implementation optional first part 120 measures two inches, saddle 130 measures three inches, extension 140 measures six inches, and the first ring and second ring are adjustable from a diameter of ten inches to a diameter of twelve inches.

FIG. 2 illustrates an example of a ring 200 used an in implementation. Ring 200 includes a first ring segment 210, a second ring segment 220, and coupling mechanisms 230. First ring segment 210 and second ring segment 220 are made of a material that can be flexed, such as a metal or a firm plastic. Coupling mechanisms 230 function to couple first ring segment 210 onto itself and close the loop, for example resulting in a smaller ring with a diameter of ten inches, or to insert second ring segment 220 and couple it with first ring segment 210 to result in a larger ring, for example with a diameter of twelve inches. Coupling mechanisms 230 may be as simple as short tubes that fit tightly over the ends of first ring segment 210 and second ring segment 220, and/or they may have additional features to lock the ends of the ring segments in place.

FIG. 3 illustrates an example ring holder 300. A ring holder may be located on the inside or the outside of the first tube. FIG. 3 shows a segment of ring holder 300 on the inside of a segment 310 of the first tube. Ring holder 300 is configured to hold the first ring or the second ring, and may include a sleeve 320 and/or a first zipper half 330 and a second zipper half 340. The first ring or the second ring can be inserted into sleeve 320, which keeps it in place during use. However, sleeve 320 may not extend the full circle around the ring, so that the ring can be removed, for example when storing or cleaning the air interface. First zipper half 330 and second zipper half 340 may substantially enclose the full circle around the ring, thus enclosing the remainder, a larger part, or the full circle, when zipped together. In such a case, sleeve 320 is optional and the pair of zipper halves can create the whole ring holder. Other implementations of a ring holder may include fasteners, such as hook-and-loop fasteners, cords, snap on mechanisms, and so on.

Figure 4:
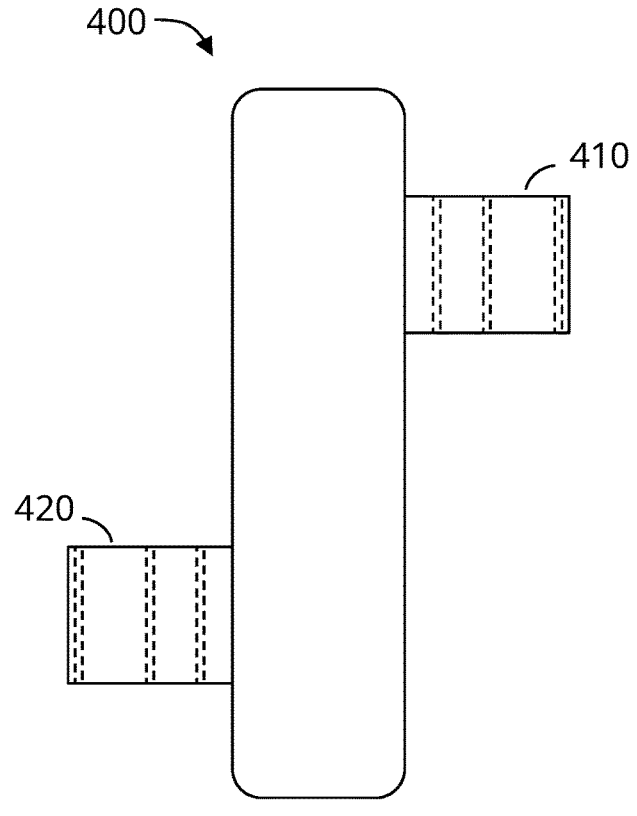
FIG. 4 illustrates a side view of an example inflatable barrier with two air interfaces.

FIG. 4 illustrates a side view of an example inflatable barrier 400 with two air interfaces (air interface 410 and air interface 420). In this example, air interface 410 is located at one side of inflatable barrier 400 whereas air interface 420 is located at the other side. Inflatable barrier 400 may be placed in a window, for example, and be coupled with an indoor air mover via temporary ducting. If the indoor space is large and must be kept at a negative air pressure, then a relatively large amount of air needs to be blown through inflatable barrier 400, requiring large diameter air intake and outlet openings. However, the outlet opening must be smaller than the intake opening to maintain sufficient pressure to keep inflatable barrier 400 inflated. The temporary duct that couples inflatable barrier 400 (e.g., via air interface 410) with the air mover can be attached as will be described with reference to FIGS. 6 and 7. However, in this case air interface 420 does not need to be coupled with any ducting. The air can just leave air interface 420 via its extension. To maintain air pressure, all that a user needs to do is to tighten the cord in the cord holder in air interface 420 sufficiently so that its diameter is smaller than the diameter of the rings in air interface 410, and lock the lock and release mechanism in air interface 420 to maintain the diameter, and thus ensure that inflatable barrier 400 remains inflated.

Figure 5:
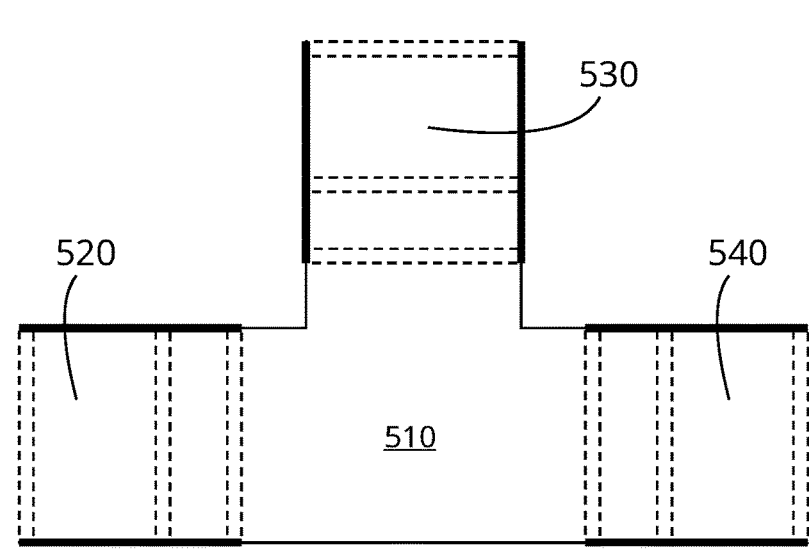
FIG. 5 illustrates a cross section of an example T-coupler air interface.

FIG. 5 illustrates a cross section of an example T-coupler air interface 500. Although two temporary ducts can be coupled with each other using a single air interface as depicted in FIG. 1, to couple more than two, e.g. N ducts, requires a body with N air interfaces. Thus, T-coupler air interface 500 has a body 510, a first air interface 520, a second air interface 530, and a third air interface 540. Body 510 is shared by the three air interfaces and can be kept as small as practical.

Figure 6:
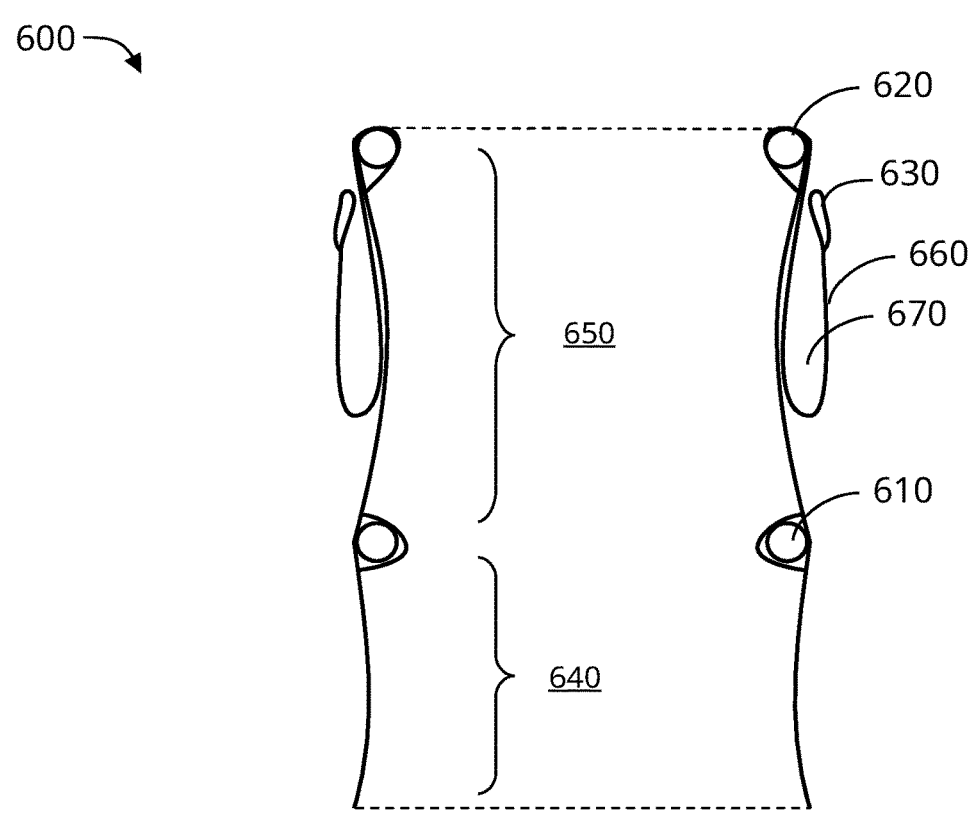
FIG. 6 illustrates an example preparation for coupling to an air interface.

FIG. 6 illustrates an example preparation for coupling to an air interface 600. The first ring 610 is inserted in the first ring holder, and the second ring 620 is inserted in the second ring holder. The cord holder 630 holds the cord (not drawn). The first ring 610, second ring 620, and cord holder 630 divide the first tube in an optional first part 640, a saddle 650, and an extension 660. The extension 660 has been folded downwards towards first ring 610 on the outside of the first tube, and upwards towards second ring 620 to create a pocket 670. This preparation allows insertion of a first flexible duct with thickened end, or end that can be narrowed, into pocket 670. It also allows insertion of a second flexible duct, before the first flexible duct is inserted. The second flexible duct, such as a lay-flat duct, can be inserted via the inside of the first tube, from the first ring to the second ring, where it is folded over and outside the second ring. Before it is inserted, its end is thickened, for example by rolling it up. Once the second duct has been inserted, the first duct can be inserted in pocket 670 as described above.

FIG. 7 shows an example method 700 of coupling one or two ducts to an air interface. The air interface may be any of the implementations described earlier in this document. Method 700 includes the following steps:

Step 710—(a) insert the first ring in the first ring holder included in the first tube.

Step 720—(b) insert the second ring in the second ring holder to create a saddle between the first ring and the second ring.

Step 730—(c) fold back at least a part of the extension over the saddle towards the first ring.

Step 740—(d) fold back a part of the at least a part of the extension towards the second ring to create a pocket over the saddle.

Step 750—(this step applies only if two ducts are connected to the air interface) (e) insert the second duct into the first tube through the first ring and the second ring. The second duct may be or include a second lay-flat duct.

Step 752—(this step applies only if two ducts are connected to the air interface) (f) roll up the end of the second lay-flat duct to thicken it.

Step 754—(this step applies only if two ducts are connected to the air interface) (g) wrap the end of the second duct over the second ring and insert it into the pocket.

Step 760—(this step applies if the first duct is or includes a first lay-flat duct) (h) roll up the end of the first lay-flat duct to thicken it.

Step 770—(i) wrap the end of a first duct over the second ring and insert it into the pocket.

Step 780—(this step may apply if the first duct is flexible and reinforced) (j) reduce the circumference of the end of the first duct. For example, the circumference of the end of the first duct can be reduced by tightening a second cord, by using hook and loop fasteners, or any other fasteners.

Step 790—(k) adjust the first cord in the first cord holder to trap the end of the first duct in the pocket. In cases where two ducts are coupled, adjust the first cord will also trap the end of the second duct in the pocket.

Figure 8:
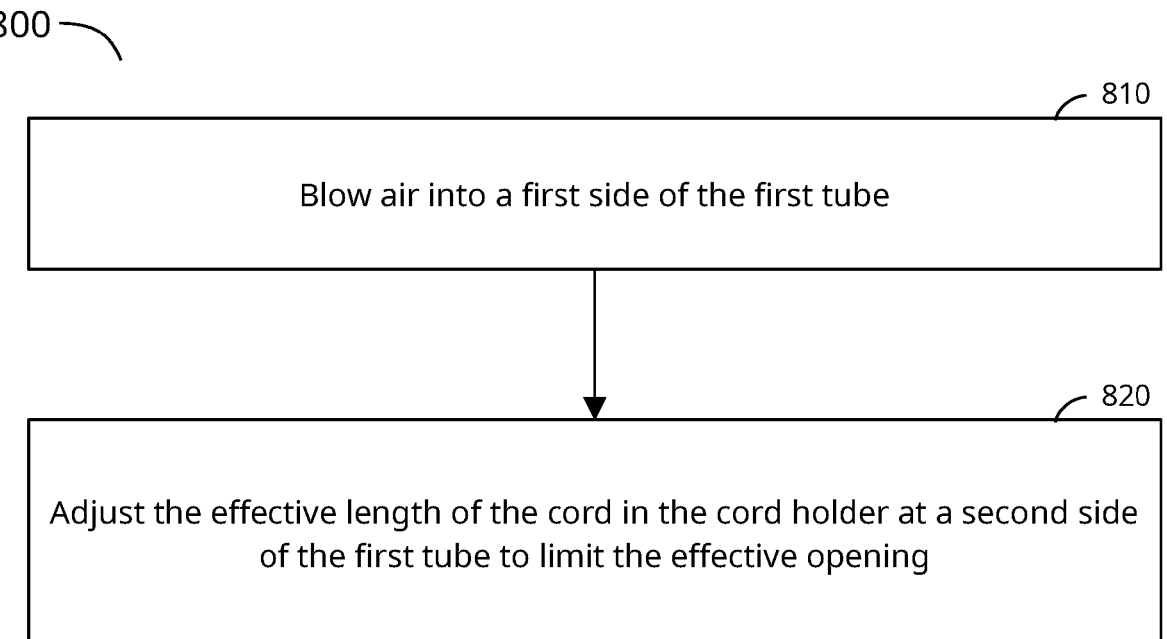
FIG. 8 illustrates an example method of restricting air flow through an air interface.

FIG. 8 illustrates an example method 800 of restricting air flow through an air interface. The air interface may be any of the implementations described earlier in this document. Method 800 includes the following steps:

Step 810—blow air into a first side of the first tube. The air may come in through the first ring and the second ring, successively.

Step 820—adjust the effective length of the cord in the cord holder at a second side of the first tube to limit an effective opening at the second side of the first tube.

Particular Implementations

Described implementations of the subject matter can include one or more features, alone or in combination, as described in the following clauses.

Clause 1. An air interface, comprising:
a first tube made of a flexible material;
a first ring;
a second ring;
a first ring holder, configured to hold at least a part of the first ring;
a second ring holder, configured to hold at least a part of the second ring;
a cord holder, configured to hold a cord; and
the cord, with a lock-and-release mechanism configured to adjust an effective length of the cord;
wherein:
the first ring holder, the second ring holder, and the cord holder partition the first tube in at least a saddle between the first ring holder and the second ring holder, and an extension between the second ring holder and the cord holder.

Clause 2. The air interface of clause 1, wherein the flexible material is airtight.

Clause 3. The air interface of clause 1 or clause 2, wherein the flexible material includes a fabric, a canvas and/or a plastic.

Clause 4. The air interface of any of the clauses 1 to 3, wherein the first ring and the second ring are adjustable in size.

Clause 5. The air interface of any of the clauses 1 to 4, wherein the first ring and the second ring are made of a material that can be flexed.

Clause 6. The air interface of any of the clauses 1 to 5, wherein the first ring holder and the second ring holder are configured to removably hold the first ring and the second ring.

Clause 7. The air interface of any of the clauses 1 to 6, wherein the first ring holder comprises a sleeve.

Clause 8. The air interface of any of the clauses 1 to 7, wherein the first ring holder comprises a pair of zipper halves.

Clause 8. The air interface of any of the clauses 1 to 8, wherein the first ring holder comprises hook and loop fasteners.

Clause 10. The air interface of any of the clauses 1 to 9, wherein the flexible material is machine washable.

Clause 11. The air interface of any of the clauses 1 to 10, wherein the cord holder comprises a sleeve with an opening.

Clause 12. A method of coupling a duct, comprising:

(a) inserting a first ring in a first ring holder included in a first tube made of a flexible material;

(b) inserting a second ring in a second ring holder included in the first tube to create a saddle between the first ring and the second ring;

(c) folding at least a part of an extension in the first tube between the second ring holder and a cord holder over the saddle towards the first ring;

(d) folding a part of the at least a part of the extension back towards the second ring to create a pocket over the saddle, wherein the pocket ends at a cord holder at an end of the extension;

(i) wrapping an end of a first duct over the second ring and inserting the end of the first duct into the pocket; and (k) adjusting the cord to trap the end of the first duct in the pocket.

Clause 13. The method of clause 12, wherein the first duct is or includes a first lay-flat duct, and the method further comprises:

(h) rolling up an end of the first lay-flat duct to thicken the end of the first lay-flat duct.

Clause 14. The method of clause 12 or clause 13, wherein the first duct is flexible and reinforced, and the method further comprises:

(j) reducing a circumference of an end of the first duct.

Clause 15. The method of any of the clauses 12 to 14, further comprising:

(e) inserting a second duct into the first tube through the first ring and the second ring; and (g) wrapping an end of the second duct over the second ring and inserting the end of the second duct into the pocket.

Clause 16. The method of any of the clauses 12 to 15, wherein the second duct is or includes a second lay-flat duct, and the method further comprises:

(f) rolling up an end of the second lay-flat duct to thicken the end of the second lay-flat duct.

Clause 17. A method of restricting an air flow, comprising:

blowing air into a first side of a first tube made of a flexible material; and adjusting an effective length of a cord in a cord holder at a second side of the first tube to limit an effective opening at the second side of the first tube; wherein: the flexible material is airtight.

Clause 18. The method of clause 17, wherein:

the first tube comprises a second ring holder inside the first tube, configured to hold at least a part of a second ring; and the first tube comprises a first ring holder inside the first tube, configured to hold at least a part of a first ring.

CONSIDERATIONS

Although the description has been described with respect to particular implementations, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. An air interface, comprising:

a first tube made of a flexible material;

a first ring;

a second ring;

a first ring holder as a part of the first tube, configured to hold at least a part of the first ring;

a second ring holder as a part of the first tube, configured to hold at least a part of the second ring;

a cord holder as a part of the first tube, configured to hold a cord; and the cord, with a mechanism configured to adjust an effective length of the cord;

wherein:

the first ring holder, the second ring holder, and the cord holder partition the first tube in at least a saddle between the first ring holder and the second ring holder, and an extension between the second ring holder and the cord holder; and the extension is configured to be folded back and forth over the saddle to create a pocket adapted to receive a second tube.

2. The air interface of claim 1, wherein the flexible material is airtight.

3. The air interface of claim 1, wherein the flexible material includes a fabric, a canvas and/or a plastic.

4. The air interface of claim 1, wherein the first ring and the second ring are adjustable in size.

5. The air interface of claim 1, wherein the first ring and the second ring are made of a material that can be flexed.

6. The air interface of claim 1, wherein the first ring holder and the second ring holder are configured to removably hold the first ring and the second ring.

7. The air interface of claim 1, wherein the first ring holder comprises a sleeve.

8. The air interface of claim 1, wherein the first ring holder comprises a pair of zipper halves.

9. The air interface of claim 1, wherein the first ring holder comprises hook and loop fasteners.

10. The air interface of claim 1, wherein the flexible material is machine washable.

11. The air interface of claim 1, wherein the cord holder comprises a sleeve with an opening.

12. A method of coupling a duct, comprising:

(a) inserting a first ring in a first ring holder included in a first tube made of a flexible material;

(b) inserting a second ring in a second ring holder included in the first tube to create a saddle between the first ring and the second ring;

(c) folding at least a part of an extension in the first tube between the second ring holder and a cord holder over the saddle towards the first ring;

(d) folding a part of the at least a part of the extension back towards the second ring to create a pocket over the saddle, wherein the pocket ends at the cord holder at an end of the extension;

(i) wrapping an end of a first duct over the second ring and inserting the end of the first duct into the pocket; and (k) adjusting the cord to trap the end of the first duct in the pocket.

13. The method of claim 12, wherein the first duct is or includes a first lay-flat duct, and the method further comprises:

(h) rolling up an end of the first lay-flat duct to thicken the end of the first lay-flat duct.

14. The method of claim 12, wherein the first duct is flexible and reinforced, and the method further comprises:

(j) reducing a circumference of an end of the first duct.

15. The method of claim 12, further comprising:

(e) inserting a second duct into the first tube through the first ring and the second ring; and (g) wrapping an end of the second duct over the second ring and inserting the end of the second duct into the pocket.

16. The method of claim 15, wherein the second duct is or includes a second lay-flat duct, and the method further comprises:

(f) rolling up an end of the second lay-flat duct to thicken the end of the second lay-flat duct.

* * * * *